US010147299B1

(12) United States Patent
Jarvis

(10) Patent No.: US 10,147,299 B1
(45) Date of Patent: *Dec. 4, 2018

(54) CAP ALARM SYSTEM

(71) Applicant: Raymond C. Jarvis, Montague, MA (US)

(72) Inventor: Raymond C. Jarvis, Montague, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/996,721

(22) Filed: Jun. 4, 2018

(51) Int. Cl.
*G08B 21/06* (2006.01)
*A42B 1/22* (2006.01)
*B60Q 9/00* (2006.01)
*A42B 1/00* (2006.01)

(52) U.S. Cl.
CPC .............. *G08B 21/06* (2013.01); *A42B 1/006* (2013.01); *A42B 1/22* (2013.01); *B60Q 9/00* (2013.01)

(58) Field of Classification Search
CPC .. A42B 1/006; A42B 1/02; A42B 1/22; A42B 1/242; G08B 21/06
USPC ............. 2/209.13, 209.14, 195.1, 200.1, 171
See application file for complete search history.

(56) References Cited

U.S. PATENT DOCUMENTS

| | | | | |
|---|---|---|---|---|
| 4,527,982 A | * | 7/1985 | Salzman ................ | A63B 69/00 200/52 R |
| 4,665,928 A | * | 5/1987 | Linial .................. | A61B 5/1121 482/1 |
| 5,425,378 A | * | 6/1995 | Swezey ................ | A61B 5/1071 600/587 |
| 5,581,239 A | * | 12/1996 | Lin ........................ | G08B 21/06 340/575 |
| 6,154,141 A | * | 11/2000 | Prater .................... | G08B 21/06 340/439 |
| 2005/0235509 A1 | * | 10/2005 | Heath .................... | A42B 1/245 33/512 |
| 2007/0015611 A1 | * | 1/2007 | Noble ................... | A61B 5/1116 473/450 |
| 2008/0027363 A1 | * | 1/2008 | Brueckmann ...... | A61H 23/0263 601/70 |
| 2014/0361881 A1 | * | 12/2014 | Reilly ................... | A42B 3/046 340/407.1 |
| 2015/0164377 A1 | * | 6/2015 | Nathan ................ | A61B 5/1122 600/595 |
| 2016/0029929 A1 | * | 2/2016 | Worthen ............... | A61B 5/1116 600/595 |

* cited by examiner

*Primary Examiner* — Gloria Hale

(57) ABSTRACT

Headwear positionable upon a head of a wearer has a front, a back, sides, and a generally circular open bottom. A band has a first section extending downwardly from the side of the headwear. The first section is folded upwardly and terminates in a second section with a free end. A snap separably couples the free end of the band to a section of the band above the bend thereby creating a chamber. A vibrator is positioned in the chamber over the temple of the wearer. A tilt switch is positioned in the chamber and is operatively coupled to the vibrator whereby a nodding wearer will tilt the tilt switch to activate the vibrator and awaken the wearer. Batteries operatively couple the vibrator and the tilt switch.

6 Claims, 4 Drawing Sheets

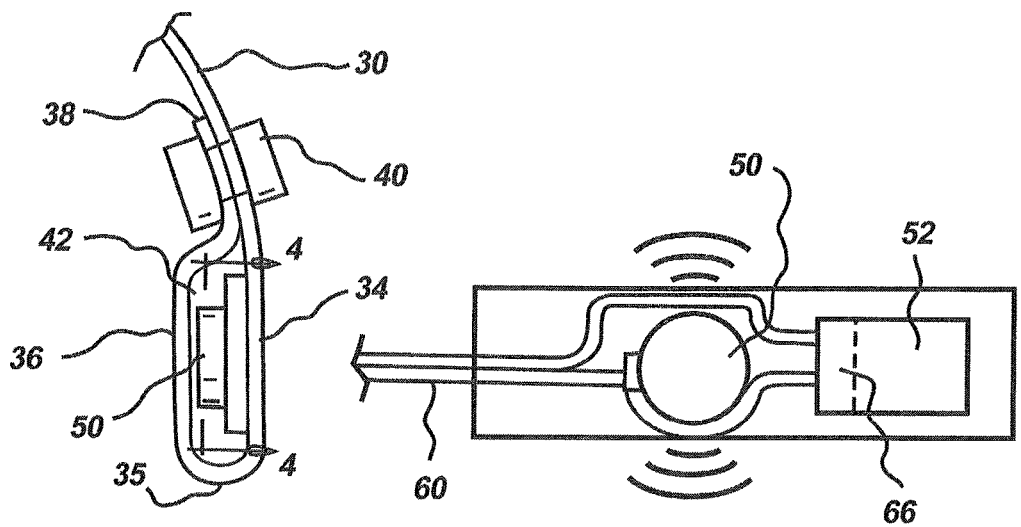
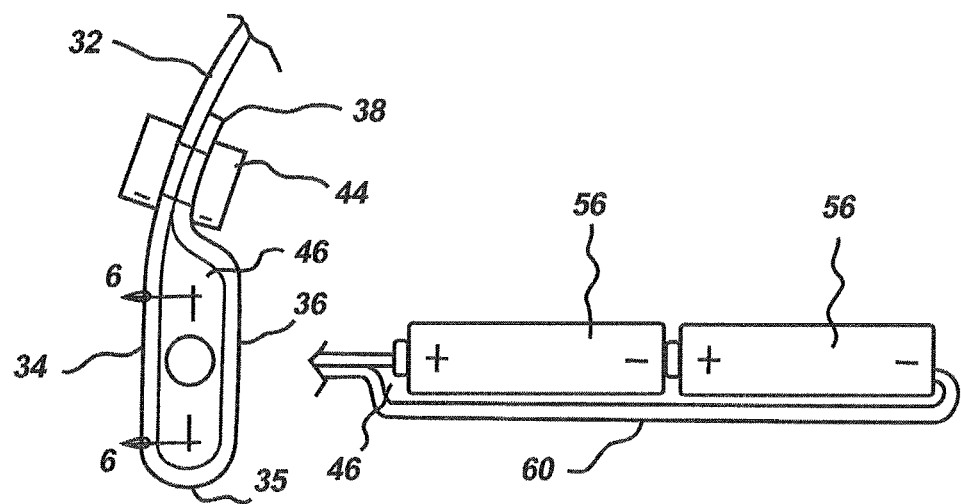

CAP ALARM SYSTEM

RELATED APPLICATIONS

This application is a continuation-in-part of U.S. patent application Ser. No. 15/894,014, filed Feb. 12, 2018, the subject matter of which is incorporated herein by reference and the priority of which is hereby claimed.

BACKGROUND OF THE INVENTION

Field of the Invention

The present invention relates to a vibrating cap system and more particularly pertains to initiating vibration when a driver nods his/her head. The vibration is to awaken the driver and abate traffic accidents. The initiating of vibration, the awakening of the driver, and the abating of accidents are done in a safe, comfortable, convenient and economical manner.

Description of the Prior Art

The use of cap systems of known designs and configurations is known in the prior art. More specifically, cap systems of known designs and configurations previously devised and utilized for the purpose of alerting a driver when his/her head nods are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe a cap alarm system that initiates vibration when a driver nods his/her head to awaken the driver and abate traffic accidents where the initiating of vibration, the awakening of the driver, and the abating of accidents are done in a safe, comfortable, convenient and economical manner.

In this respect, the cap alarm system according to the present invention substantially departs from the conventional concepts and designs of the prior art, and in doing so provides an apparatus primarily developed for the purpose of initiating vibration when a driver nods his/her head to awaken the driver and abate traffic accidents. The initiating of vibration, the awakening of the driver; and the abating of accidents is done in a safe, comfortable, convenient and economical manner.

Therefore, it can be appreciated that there exists a continuing need for a new and improved cap alarm system which can be used for initiating vibration when a driver nods his/her head to awaken the driver and abate traffic accidents. In this regard, the present invention substantially fulfills this need.

SUMMARY OF THE INVENTION

In view of the disadvantages inherent in the known types of cap systems of known designs and configurations now present in the prior art, the present invention provides an improved vibrating cap system. As such, the general purpose of the present invention, which will be described subsequently in greater detail, is to provide a new and improved vibrating cap system and method which has all the advantages of the prior art and none of the disadvantages.

To attain this, from a broad perspective, first provided is headwear. The headwear is positionable upon a head of a wearer. The headwear has a front, a back, sides, and a generally circular open bottom. A band has a first section extending downwardly from a side of the headwear. The first section is folded upwardly. The first section terminates in a second section. The second section has a free end. A snap separably couples the free end of the band to a section of the band above the bend. In this manner a chamber is created. A vibrator is positioned in the chamber. The vibrator is positionable over the temple of the wearer. A tilt switch is positioned in the chamber. The tilt switch is operatively coupled to the vibrator. In this manner a nodding wearer will tilt the tilt switch which will activate the vibrator and awaken the wearer. Batteries are operatively coupled to the vibrator and the tilt switch.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of are practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved cap alarm system which has all of the advantages of the prior art cap systems of known designs and configurations and none of the disadvantages.

It is another object of the present invention to provide a new and improved cap alarm system which may be easily and efficiently manufactured and marketed.

It is a further object of the present invention to provide a new and improved cap alarm system which is of durable and reliable constructions.

An even further object of the present invention is to provide a new and improved cap alarm system which is susceptible of a low cost of manufacture with regard to both materials and labor, and which accordingly is then susceptible of low prices of sale to the consuming public, thereby making such cap alarm system economically available to the buying public.

Lastly, it is an object of the present invention to provide a cap alarm system for initiating vibration when a driver nods his/her head to awaken the driver and abate traffic accidents. The initiating of vibration, the awakening of the driver, and the abating of accidents are done in a safe, comfortable, convenient and economical manner.

These together with other objects of the invention, along with the various features of novelty which characterize the invention, are pointed out with particularity in the claims annexed to and forming a part of this disclosure.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3-3 of FIG. 2.

FIG. 4 is a cross sectional view taken along line 4-4 of FIG. 3.

FIG. 5 is a cross sectional view taken along line 5-5 of FIG. 2.

FIG. 6 is a cross sectional view taken along line 6-6 of FIG. 5.

The same reference numerals refer to the same parts throughout the various Figures.

DESCRIPTION OF THE PREFERRED EMBODIMENT

Figure 1:
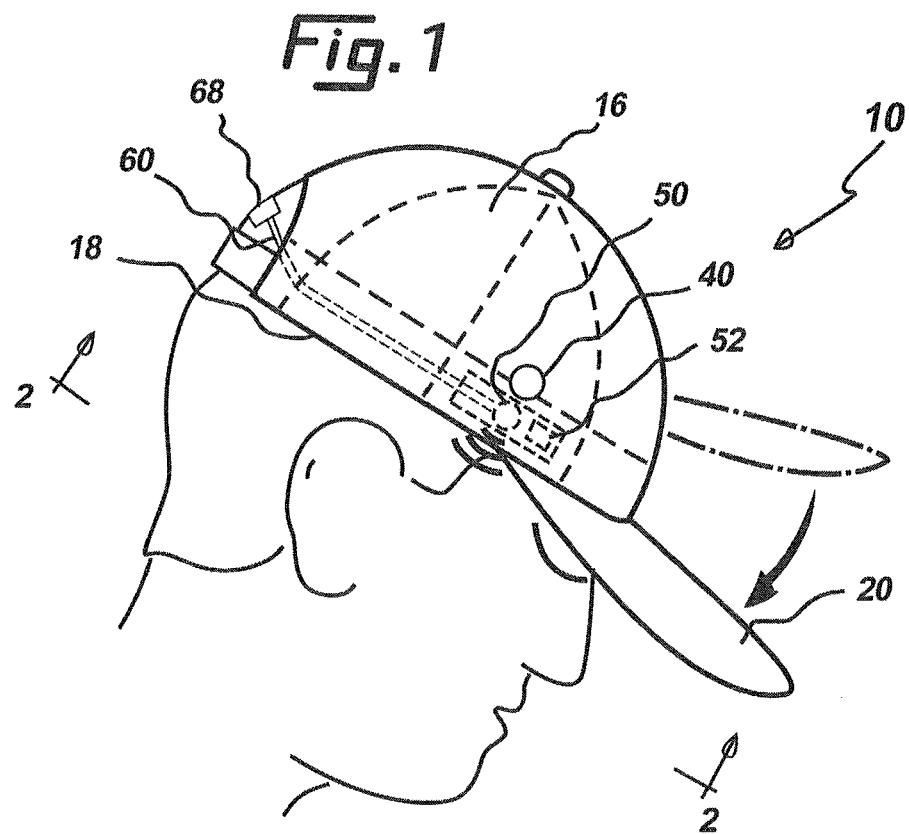
FIG. 1 is a side elevational view of a vibrating cap system constructed in accordance with the principles of the present invention.
Figure 2:
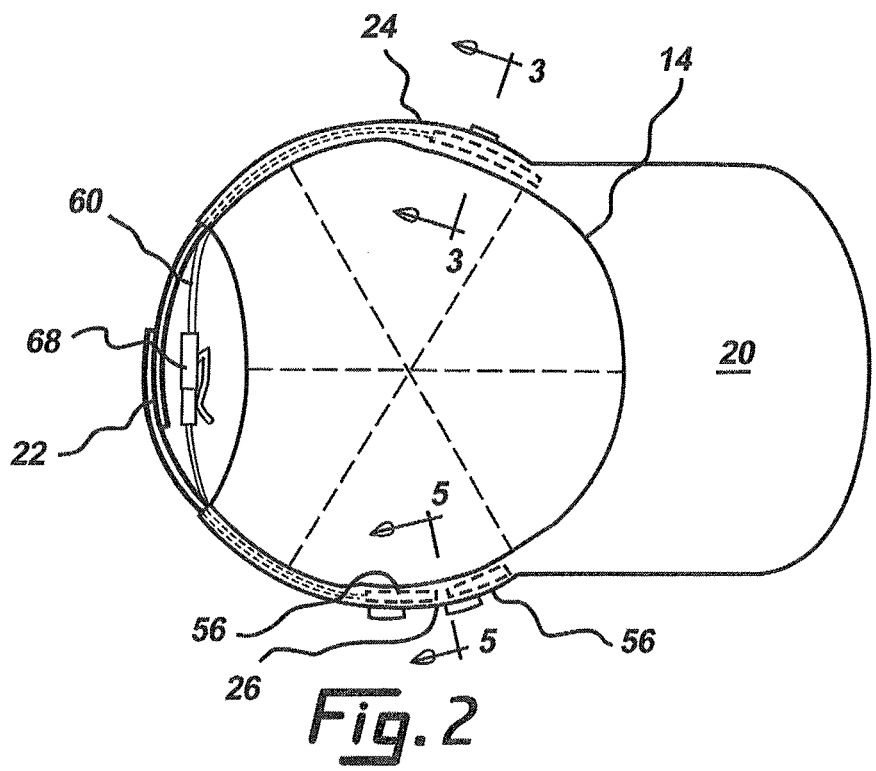
FIG. 2 is a bottom view of the system taken along line 2-2 of FIG. 1.

With reference now to the drawings, and in particular to FIG. 1 thereof, the preferred embodiment of the new and improved vibrating cap system embodying the principles and concepts of the present invention and generally designated by the reference numeral 10 will be described.

The present invention, the vibrating cap system 10, is comprised of a plurality of components. In their broadest context such include a headwear, a band, a vibrator, and batteries. Such components are individually configured and correlated with respect to each other so as to attain the desired objective.

In the preferred embodiment of the vibrating cap system, designated by reference numeral 10, first provided is a cap 14. The cap is positionable upon the head of a driver. The cap has a hemispherical top 16. The cap has generally circular open bottom 18. The cap has a front. The front has a bill 20. The cap has a circumference adjusting back 22. The cap also has laterally positioned first and second sides 24, 26.

A first headband 30 and a laterally spaced second headband 32 are next provided. Each headband has an exterior section 34. The exterior section extends downwardly from the first and second sides of the cap. Each headband is folded upwardly forming a bend 35. Each headband terminates in an interior section 36. The interior section has a free end 38.

A first snap 40 separably couples the free end of the first headband to a section of the first headband above the bend. In this manner a first chamber 42 is created. The headband has a second snap 44 separably coupling the free end of the second headband to a section of the second headband above the bend. In this manner a second chamber 46 is created.

A vibrator 50 is provided. The vibrator is positioned in the first chamber. The vibrator is positionable over a temple of the driver when worn. A tilt switch 52 is provided. The tilt switch is positioned in the first chamber. The tilt switch is operatively coupled to the vibrator. In this manner a nodding driver wearing the cap will tilt the switch and activate the vibrator. In this manner the driver is awakened.

Provided next are batteries 56 in the second chamber. The batteries are a source of electrical potential to power the vibrator and the tilt switch.

Further provided are wires 60. The wires couple the vibrator and the tilt switch to the batteries. The wires extend between the first and second chambers around the back of the cap.

Provided last is a controller 66. The controller has a separable connector 68. The separable connector is operatively coupled between the tilt switch and the vibrator. In this manner the vibrator is activated for a first period of time when the tilt switch is first tilted. Also in this manner the vibrator is inactivated after the first period of time. The controller is adapted to re-activate the vibrator for a second period of time when the tilt switch is tilted for a second time and to inactivate the vibrator after passage of the second period of time. The second period of time is greater than the first period of time. The controller is adapted to inactivate the vibrator when the tilt switch is tilted for a third period time.

Figure 7:
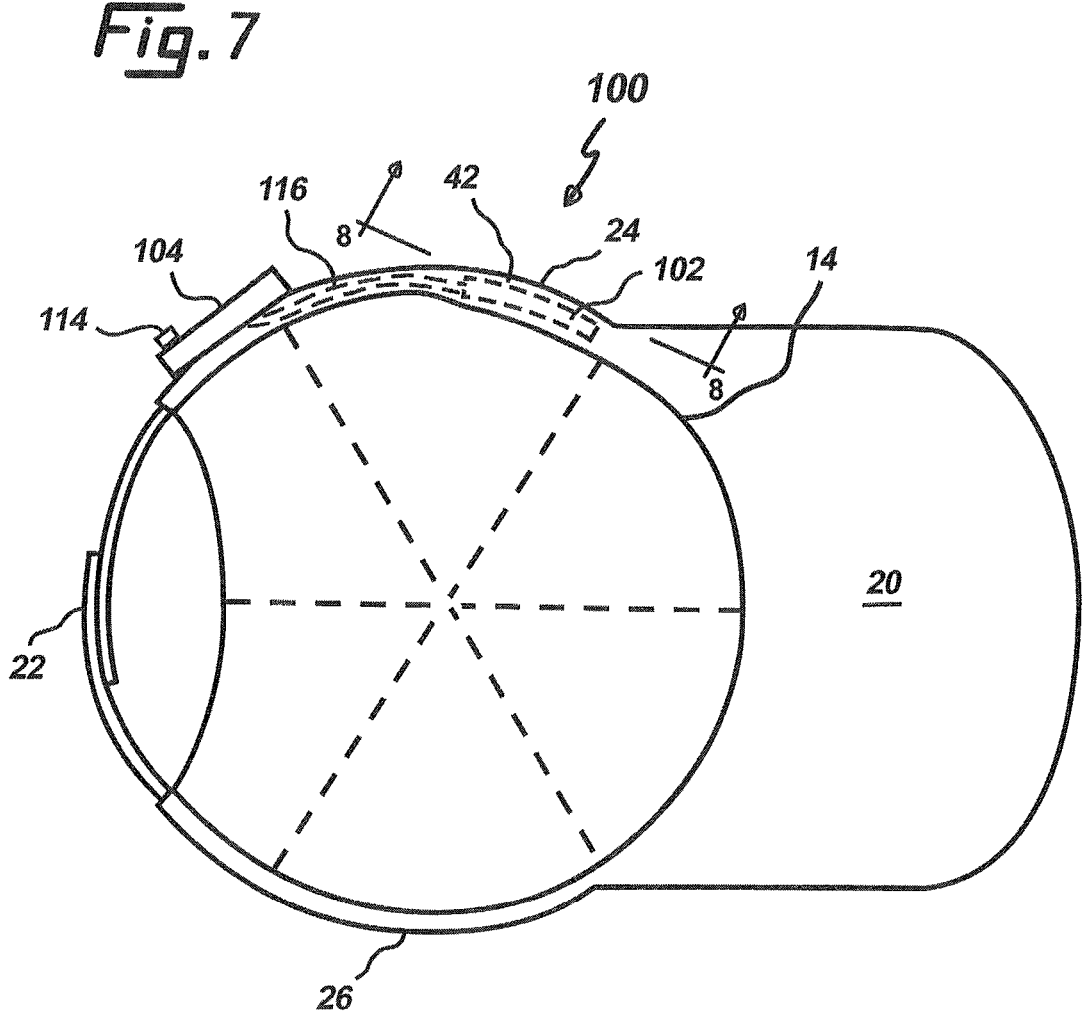
FIG. 7 is a bottom view of the system similar to FIG. 2 but illustrating an alternate embodiment of the invention.
Figure 8:
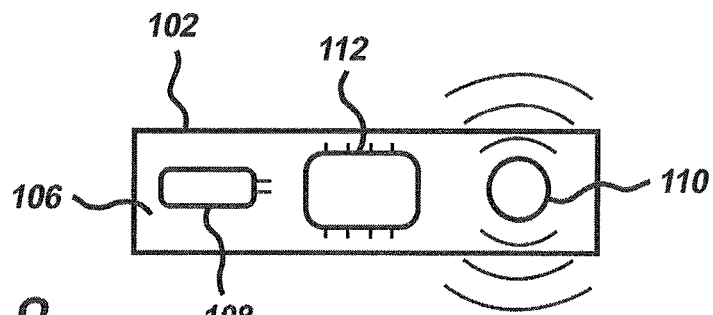
FIG. 8 is a cross sectional view taken along line 8-8 of FIG. 7.
Figure 9:
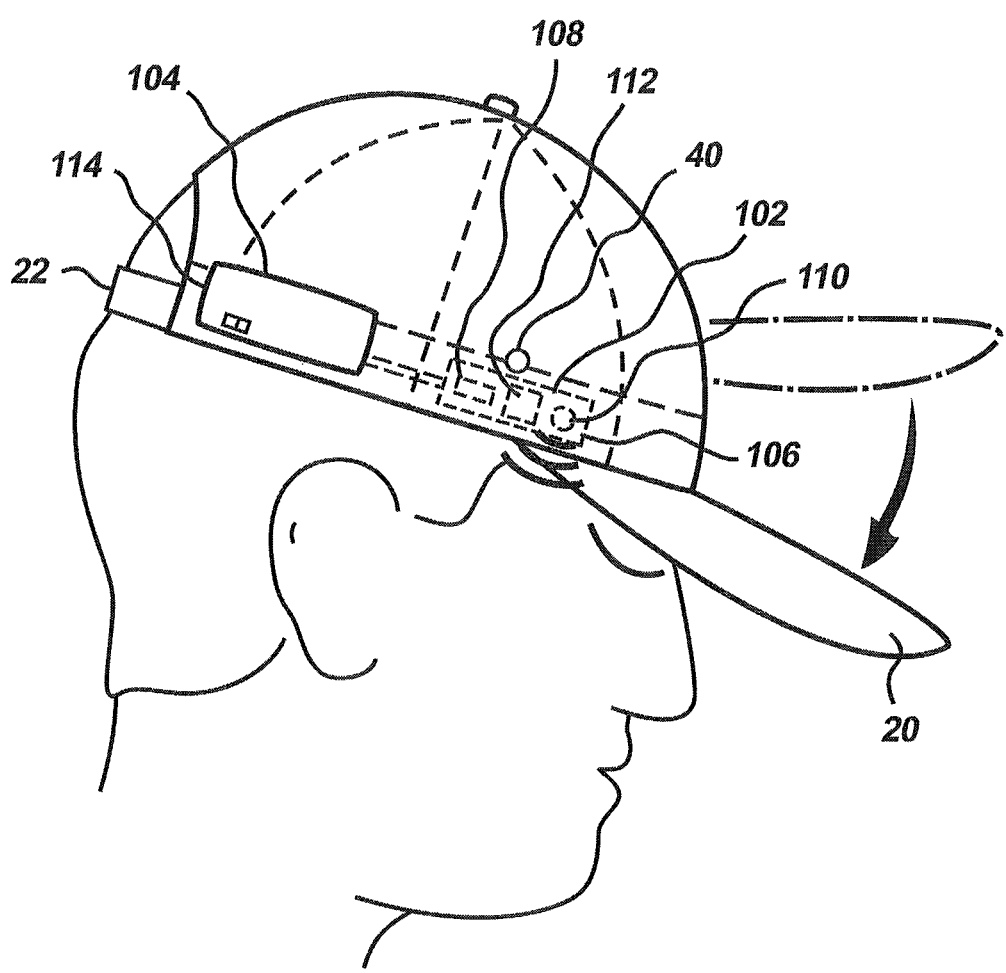
FIG. 9 is a side elevational view of the alternate embodiment shown in FIG. 7.

An alternate embodiment of the system 100 is shown in FIGS. 7-9. In this embodiment, an electrical assembly 102 is provided in the first chamber 42 and a battery pack 104 is mounted on the outside of the cap. The electrical assembly includes a printed circuit board 106, a tilt switch 108, a vibrator 110 and a controller 112. The battery pack includes an internal battery and a switch 114 which gives the wearer the ability to turn the power on or off while wearing the cap. Further provided are electrical leads 116. The electrical leads couple the electrical assembly to the battery pack.

The headwear in an alternate embodiment of the invention is a visor. In another embodiment, the switch is a non-mercury switch. As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vibrating headwear system comprising:
   a headwear positionable upon a head of a wearer, the headwear having a front, a back, sides, and a generally circular open bottom;
   a band having a first section extending downwardly from a side of the headwear, the first section being folded upwardly and terminating in a second section with a free end, a snap separably coupling the free end of the band to a section of the band above the bend thereby creating a chamber;
   a vibrator positioned in the chamber, the vibrator being positionable over a temple of a wearer, a tilt switch positioned in the chamber operatively coupled to the vibrator whereby a nodding wearer will tilt the tilt switch to activate the vibrator and awaken the wearer; and
   batteries operatively coupled to the vibrator and the tilt switch.

2. The system as set forth in claim 1 wherein the headwear is a cap.

3. The system as set forth in claim 1 wherein the headwear, in an alternate embodiment of the invention, is a visor.

4. The system as set forth in claim 1 wherein the tilt switch is a non-mercury switch.

5. The system as set forth in claim 1 and further including:
   a controller operatively coupled between the tilt switch and the vibrator to activate the vibrator for a first period of time when the tilt switch is first tilted and to inactivate the vibrator after the first period of time, the controller adapted to re-activate the vibrator for a second period of time greater than the first period of time when the tilt switch is tilted for a second time and to inactivate the vibrator after passage of the second period of time, the controller adapted to inactivate the vibrator when the tilt switch is tilted for a third period time.

6. A vibrating cap system (10) for initiating vibration when a driver nods his/her head to awaken the driver and abate traffic accidents, the initiating of vibration, the awakening of the driver and the abating of accidents being done in a safe, comfortable, convenient, and economical manner, the system comprising, in combination:
   a cap (14) positionable upon the head of the driver, the cap having a hemispherical top (16), a generally circular open bottom (18), a front with a bill (20), a circumference adjusting back (22), and laterally positioned first and second sides (24)(26);
   a first headband (30) and a laterally spaced second headband (32), each headband having an exterior section (34) extending downwardly from the first and second sides of the cap, each headband being folded upwardly forming a bend (35) and terminating in an interior section (36) with a free end (38), a snap (40) separably coupling the free end of the first headband to a section of the first headband above the bend thereby creating a first chamber (42);
   an electrical assembly (102), positioned in the first chamber, including a printed circuit board (106), and a tilt switch (108), and a vibrator (110) and a controller (112), the printed circuit board having a printed circuit board length, the vibrator being positionable over a temple of the driver when worn, the tilt switch being operatively coupled to the vibrator whereby a nodding driver wearing the cap will tilt the switch to activate the vibrator to awaken the driver, the controller operatively coupled between the tilt switch and the vibrator to activate the vibrator for a first period of time when the tilt switch is first tilted and to inactivate the vibrator after the first period of time, the controller adapted to re-activate the vibrator for a second period of time greater than the first period of time when the tilt switch is tilted for a second time and to inactivate the vibrator after passage of the second period of time, the controller adapted to inactivate the vibrator when the tilt switch is tiled for a third period time;
   a battery pack (104) and a switch (114) mounted on the outside of the cap as a source of electrical potential to power on and off the electrical assembly, the battery pack having a battery pack length; and
   electrical leads (116) coupling the electrical assembly to the battery pack, the electrical leads having a length being less than the printed circuit board length and being less than the battery pack length.

* * * * *